United States Patent [19]
Ishikawa

[11] Patent Number: 4,864,416
[45] Date of Patent: Sep. 5, 1989

[54] METHOD AND APPARATUS FOR READING ORIGINAL

[75] Inventor: Yuji Ishikawa, Kawasaki, Japan

[73] Assignee: Canon Kabushiki Kaisha, Tokyo, Japan

[21] Appl. No.: 139,116

[22] Filed: Dec. 28, 1987

Related U.S. Application Data

[63] Continuation of Ser. No. 63,732, Jun. 17, 1987, abandoned, which is a continuation of Ser. No. 669,067, Nov. 7, 1984, abandoned.

[30] Foreign Application Priority Data

Nov. 10, 1983 [JP] Japan .................................. 58-209826

[51] Int. Cl.⁴ ............................................. H04N 1/17
[52] U.S. Cl. .................................... 358/486; 358/494
[58] Field of Search ............... 358/286, 293, 280, 486, 358/494

[56] References Cited

U.S. PATENT DOCUMENTS

| | | | |
|---|---|---|---|
| 4,160,279 | 7/1979 | Fuwa | 358/288 |
| 4,297,727 | 10/1981 | Ogawa et al. | 358/261 |
| 4,338,637 | 7/1982 | Ueno | 358/288 |
| 4,748,514 | 3/1988 | Bell | 358/288 |

Primary Examiner—Edward L. Coles, Sr.
Attorney, Agent, or Firm—Fitzpatrick, Cella, Harper & Scinto

[57] ABSTRACT

An image reading apparatus has a photo line sensor, a motor, buffers, a memory, a process unit, and a CPU. A facsimile system has such an apparatus, a transfer section and a modem. Image datas of an original is read out during displacement of the original to allow reliable, fast image processing.

9 Claims, 9 Drawing Sheets

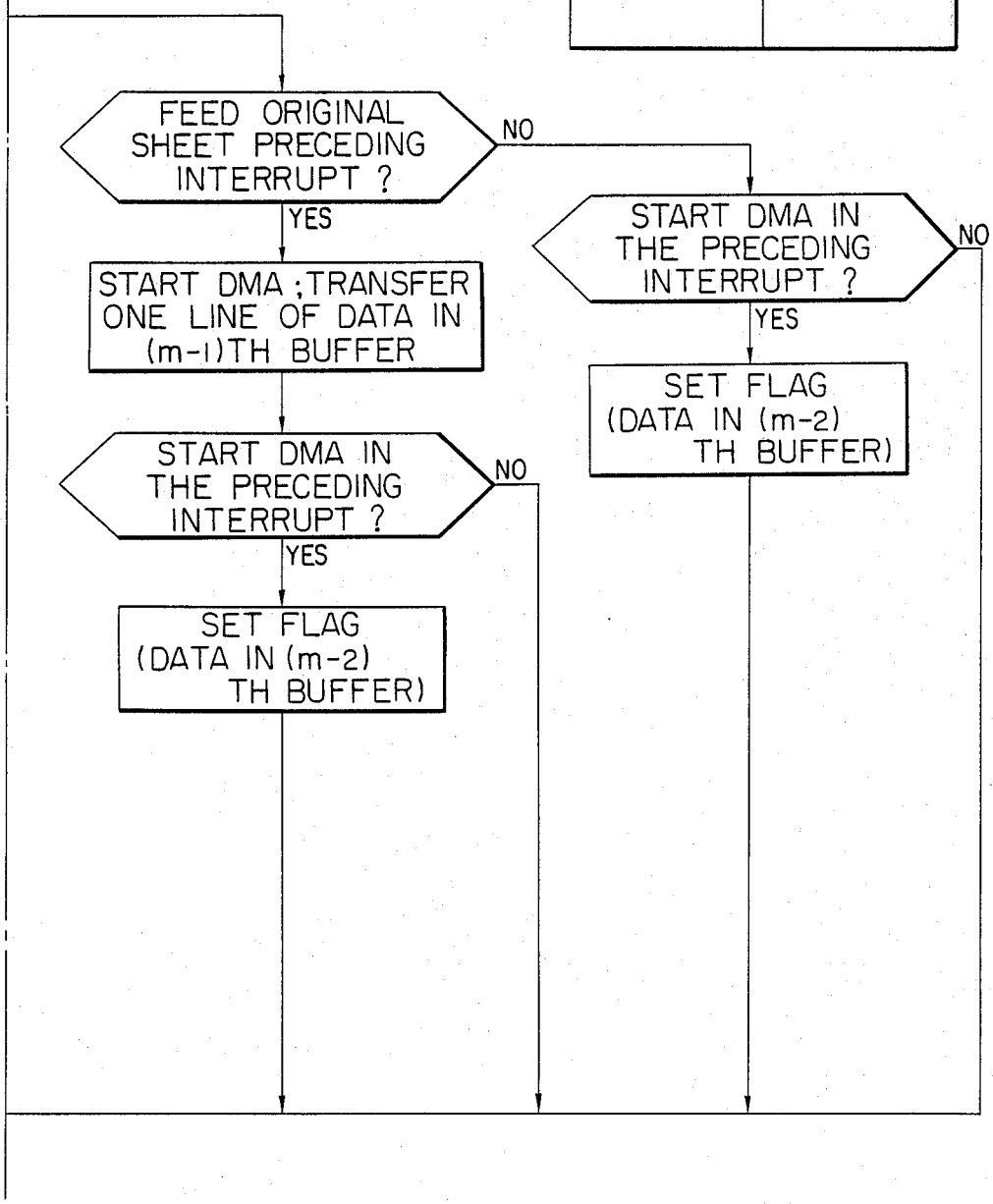

1

METHOD AND APPARATUS FOR READING ORIGINAL

This application is a continuation of application Ser. No. 063,732 filed June 17, 1987, which is a continuation of application Ser. No. 669,067, filed on Nov. 7, 1984 both now abandoned.

BACKGROUND OF THE INVENTION

1. Field of the Invention

The present invention relates to a method and apparatus for reading an original sheet by converting an original image to an electrical signal and, more particularly, to a method and apparatus for reading an original sheet by using a charge storage type photo sensor.

2. Description of the Prior Art

When an original sheet is fed intermittently and a photo sensor reads an original image asynchronously with original sheet feeding, the reading range or interval of the photo sensor will not be constant, thus degrading resolution.

In order to prevent this, as shown in FIG. 1, a conventional method has been proposed wherein a displacement of the original sheet has a periodic relationship with an output of the photo sensor in such a manner that the data charged by the photo sensor is not read while the original sheet is moved. Another conventional method has been proposed wherein the ratio of the displacement time of the original sheet to the charge time of the photo sensor is small.

Referring to FIG. 1, time T1 is the displacement time of the original sheet; and T2, the charge time of the photo sensor.

When high-speed reading of the original sheet is performed in accordance with such methods, the displacement time T1 of the original sheet or the charge time T2 of the photo sensor must be shortened. In order to shorten the displacement time T1 of the original sheet, an expensive stepping motor with a high torque is required. If this is used, the apparatus becomes heavy and generates much noise.

In order to shorten the charge time T2 of the photo sensor, the amount of light received by the photo sensor must be increased. For this purpose, a high-luminance light source is required, resulting in high power consumption.

SUMMARY OF THE INVENTION

The present invention has been made to eliminate the conventional drawbacks described above, and has as its object to provide a method of reading an original image by using a low-speed compact motor with less noise and low power consumption.

It is another object of the present invention to provide a method and apparatus for accurately reading an original image with a given density.

It is still another object of the present invention to provide an apparatus for reading an original image wherein reading and feeding of an original sheet and coding of a read image can be effectively performed.

According to the present invention, the foregoing objects are achieved by providing a facsimile system in which a photo line sensor may be used for reading image data from an original, the original being displaced for secondary scanning, and a temporary storage means is provided for temporarily storing image data read by the sensor. According to one aspect of the invention, the system is controlled so that storage operation of the sensor, displacement of the original and transfer of data to the temporary storage means are performed in synchronism with pulses from a generating means, and the storage means has a capacity corresponding to at least three lines, displacement being performed when the capacity corresponding to one line is vacant, image data being supplied via the transfer operation with respect to capacity corresponding to one of the other two lines, and a coding device performing coding operation with respect to image data in capacity corresponding to at least one remaining line. This arrangement permits virtually continuous operation of the device, since these three operations can thus be performed in parallel.

According to another aspect of the invention, operation of the system is controlled to a program which controls displacement of the original for each predetermined period via an interruption processing, and performs a coding processing according to an ordinary routine, i.e., a routine distinct from the interruption processing. This provides benefits similar to those of the aspect of the invention mentioned above.

The above and other objects, features and advantages will be more fully appreciated from the following detailed description in conjunction with the accompanying drawings.

DETAILED DESCRIPTION OF THE PREFERRED EMBODIMENTS

The present invention will be described in detail with reference to the preferred embodiments.

Figure 1:
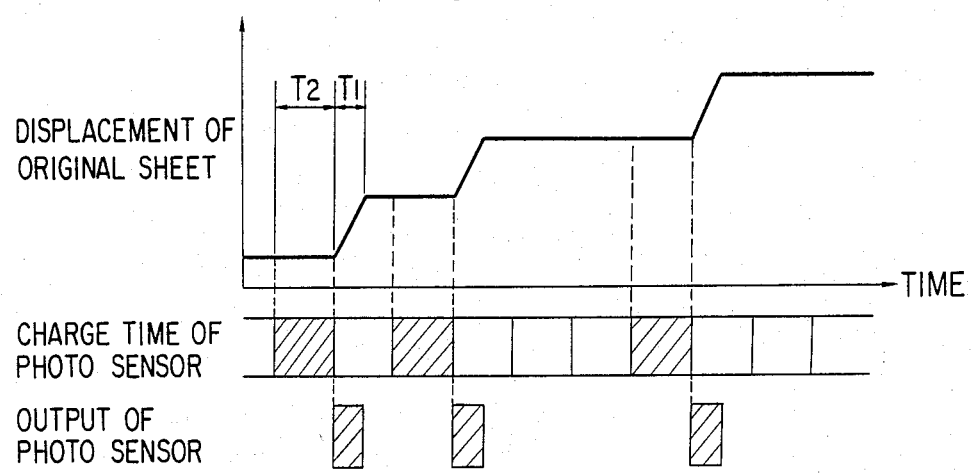
FIG. 1 is a timing chart for explaining a relationship between the displacement of an original sheet and charging and reading of a photo sensor according to a conventional method.
Figure 2:
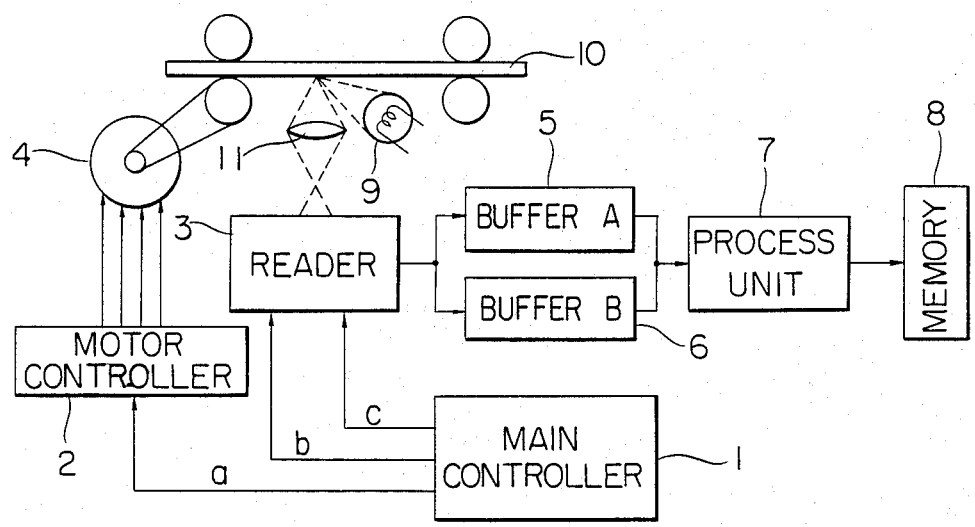
FIG. 2 is a block diagram for explaining an embodiment of the present invention.

FIG. 2 is a block diagram for explaining a first embodiment of the present invention. A main controller (CPU) 1 controls the respective components of the image reading apparatus. A motor controller 2 controls rotation of a motor 4 for feeding an original sheet 10 in response to a command from the main controller 1. A reader 3 has a photo line sensor which is charged by light reflected by the original sheet 10. The light emitted from a light source 9 and reflected by the original sheet 10 is focused by a lens 11 so that the original image can be read by the reader 3. The reader 3 is connected to a process unit 7 through buffers 5 and 6 each of which has a capacity of one-line data. The input terminal of a memory 8 is connected to the output terminal of the process unit 7. The process unit 7 performs redundancy suppression of data from the buffers 5 and 6 in accordance with one- or two-dimensional coding, thus complying with recommendation T3 of the Consultative Committee of International Telegraph and Telephone (CCITT). The suppressed data is stored in the memory 8.

In the above circuit arrangement, when the data are not stored in the buffers 5 and 6, the main controller 1 supplies a displacement request signal a to the motor controller 2 so as to feed the original sheet 10 for one-line reading. At the same time, the main controller 1 supplies a charge start signal b to the reader 3 to cause the reader 3 to delete all charge data and start recharge. The motor controller 2 feeds the original sheet for one-line reading within the charge time T3 in response to the signal a. When the time T3 has elapsed after reflected light is charged by the reader 3, the main controller 1 generates a transfer request signal c to cause the reader 3 to transfer data to the buffers 5 and 6.

When the data transfer to the buffer 5 is completed, the process unit 7 performs redundancy suppression of the data in the buffer 5. The suppressed data is stored in the memory 8. The buffers 5 and 6 are alternately used by the reader 3 and the process unit 7.

When the charged read data is transferred to one of the buffers 5 and 6, and the data in the other buffer has been completely processed by the process unit 7, the data is transferred to the buffer and at the same time the next line data is read (i.e., the original sheet 10 is displaced and is at the same time subjected to original image storage in the photo line sensor in the reader 3). However, when the data in one of the buffers 5 and 6 is being processed by the process unit 7 while the data in the other of the buffers 5 and 6 is transferred, the original 10 will not be displaced. The information charged in the photo sensor will not be transferred to the buffer 5 or 6 when the original sheet 10 is not fed (for, e.g., the period t3). In other words, the information charged by the photo line sensor is transferred to the buffer 5 or 6 only during the period while the original sheet 10 is being fed.

Figure 3:
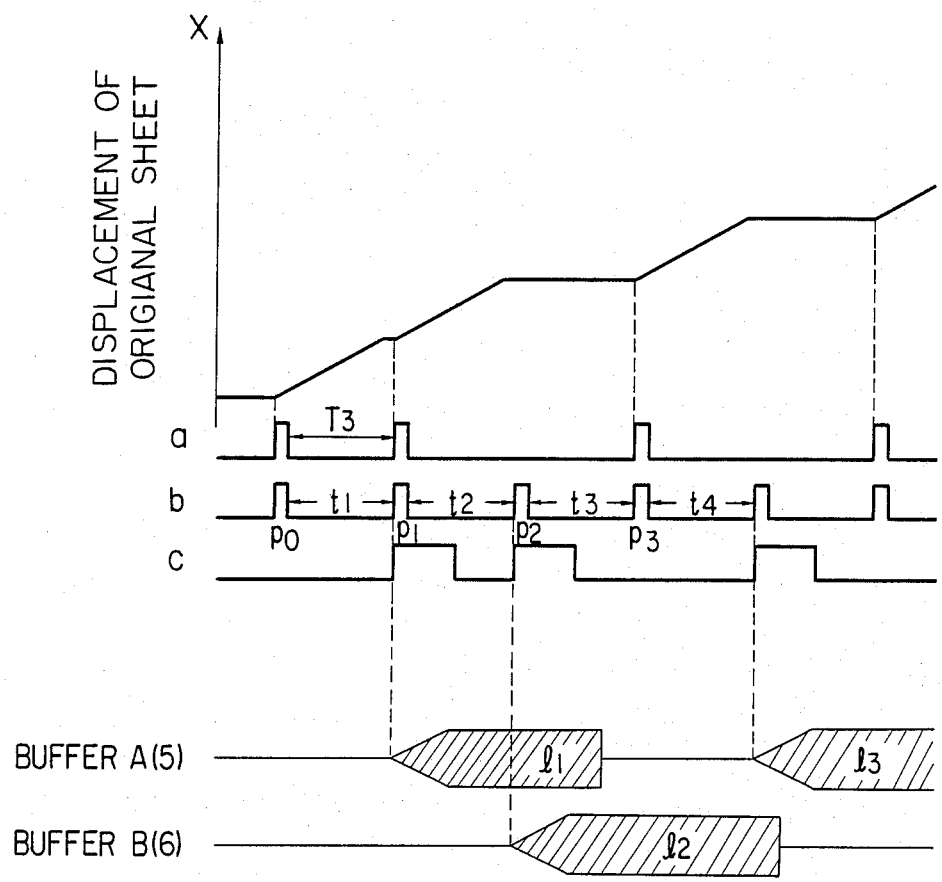
FIG. 3 is a timing chart for explaining a relationship between the displacement of an original sheet and charging and reading of a photo sensor according to a method of the embodiment.

FIG. 3 is a timing chart for explaining a relationship between the displacement of the original sheet and the respective signals. Referring to FIG. 3, buffers A and B correspond to the buffers 5 and 6, respectively. A hatched portion indicates that effective data is present in the corresponding buffer.

The actual operation will be described with reference to the timing chart of FIG. 3.

Since effective data is not stored in the buffer 5 at time P0, the original sheet 10 is fed by a one-line length. After time P1, the data charged during the time t1 is transferred to the buffer 5. This state is indicated by a hatched portion l1. In this case, no effective data is present in the buffer 6, and therefore the original sheet is simultaneously fed by the one-line length.

After time P2, the data of the photo sensor charged during the time t2 is transferred to the buffer 6. This state is indicated by a hatched portion l2.

After time P3, the original sheet is not fed for a time t3. The data of the photo sensor charged during the time t3 is not used. At this time, effective data is not stored in the buffer 5, and therefore the original sheet is fed by a one-line length. The same operation as described above is performed to continuously read the original image.

In this manner, the photo sensor charge start signal b serves as a reference signal, i.e., a system clock for the start of charge of the photo sensor and the transfer of an image signal to the buffer. The periods t1, t2, t3 and t4 (all are equal) of the system clocks are set at a minimum transfer period of one-line image data which complies with the T30 standard of the CCITT.

In a facsimile system, the minimum transmission time defines a minimum time required for a coding process, or feeding of the original sheet or a recording sheet by the one-line length. In this embodiment, the periods t1 to t4 of the system clocks coincide with the minimum transmission time. Therefore, the one-line charge of the photo sensor will not be ended after the coding is already completed. In other words, the one-line charge of the photo sensor will not be ended after original sheet feeding is completed. Therefore, dead time can be eliminated, and the original sheet can be effectively read.

In the first embodiment, the time required for one-line feeding of the original sheet is substantially the same as that of the charge time of the photo sensor. However, even if the length of time of original sheet feeding varies by about 30% from the length of time of photo sensor charging, the same effect as in the first embodiment can be obtained.

In the first embodiment, two buffers each having a one-line capacity are used. However, in a second embodiment a buffer having a three-line capacity is used and is controlled by a microprocessor as follows. The second embodiment is exemplified by a facsimile system shown in FIG. 4.

Figure 4:
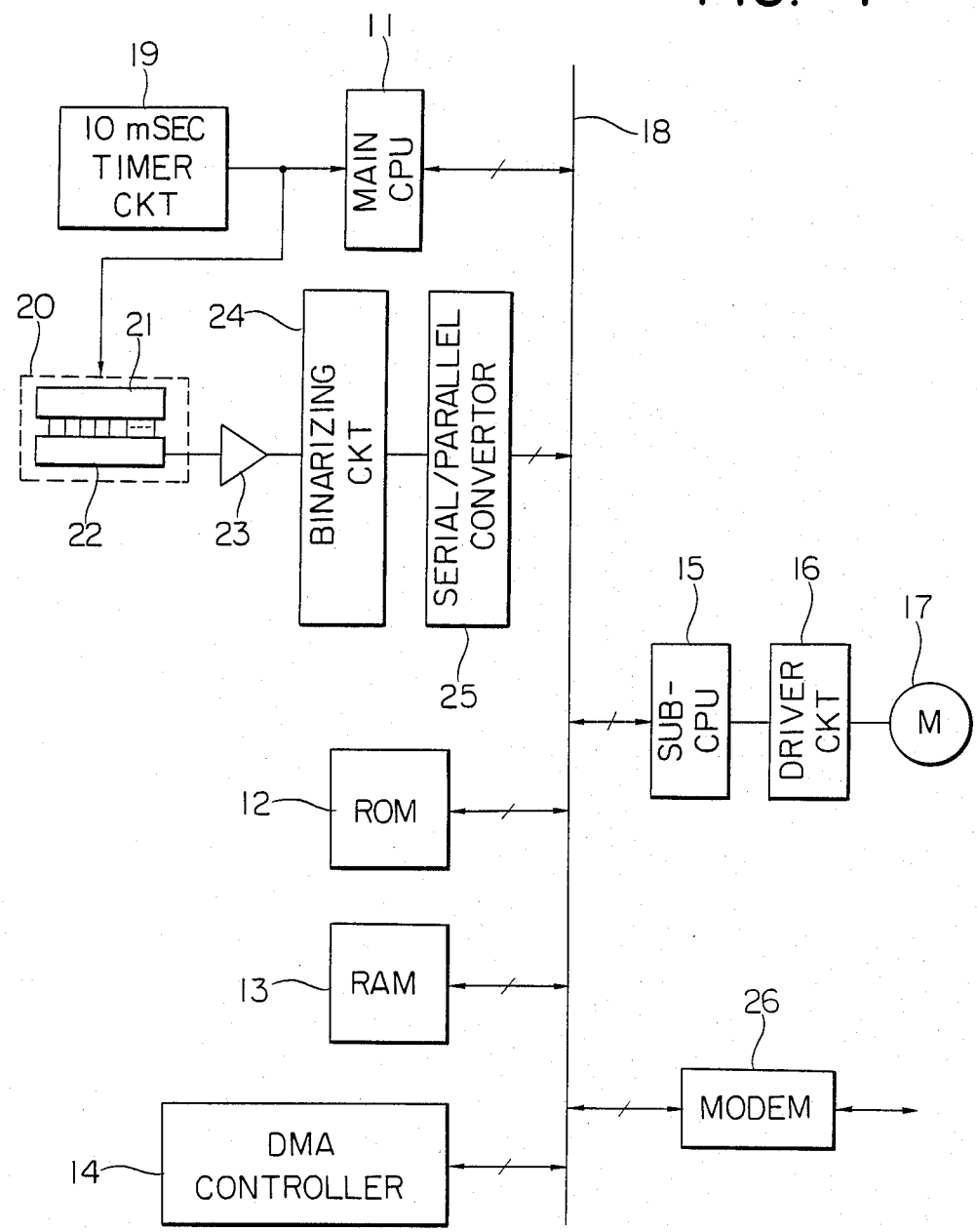
FIG. 4 is a control block diagram of a facsimile system according to a second embodiment of the present invention.

Referring to FIG. 4, a main CPU 11 controls the coding process and reading. A read-only memory (ROM) 12 stores a control program of the main CPU 11. A random access memory (RAM) 13 temporarily stores necessary flags or the like required for control of buffer memories for storing three-line image data, a FiFo (First-in First-out) buffer memory, and the CPU 11. A direct memory access (DMA) controller 14 controls a direct access of the memory. A sub-CPU 15 controls a driver circuit 16 for driving an original sheet feed motor 17. A 10 msec timer circuit 19 generates a pulse signal for every minimum transmission period of 10 msec. A read CCD 20 comprises an exposure section 21 which is charged in accordance with light reflected by the original sheet and a transfer section 22 for transferring the charge outside the CCD 20. An amplifier 23 amplifies an output from the CCD 20. A binarizing circuit 24 binarizes an output from the amplifier 23 to white and black values. A serial/parallel converter 25 converts an output serial signal of the binarizing circuit 24 to a parallel signal having a process bit number (e.g., 8 bits) of the CPU 11. A modem 26 modulates a transmission signal and demodulates a reception signal. An output from the modem 26 is transmitted to another facsimile system through a telephone line.

An output pulse from the 10 msec timer circuit 19 is supplied to the interrupt input terminal of the main CPU 11 and the CCD 20. The main CPU 11 performs an interrupt process (to be described later) in response to an interrupt input. In the CCD 20, the charge from the exposure section 21 is transferred to the transfer section 22 in response to an output pulse from the timer circuit 19. The exposure section 21 transfers the charge while it starts charging.

Figure 5:
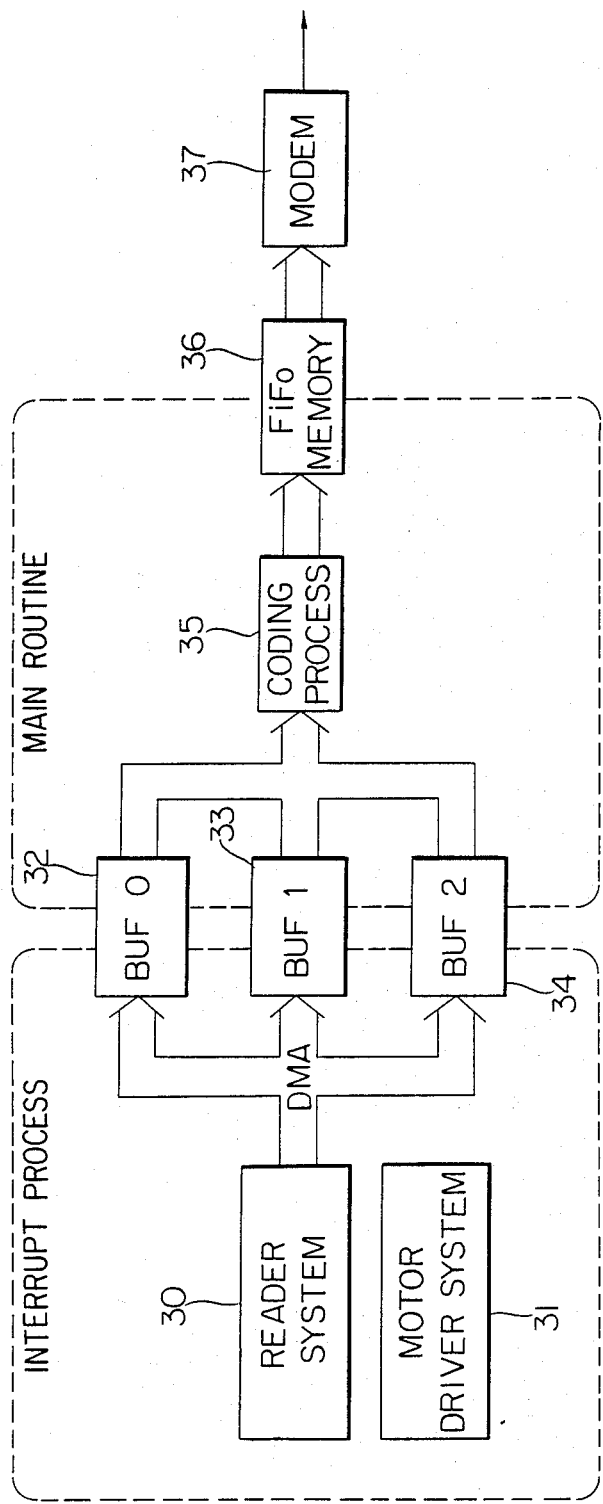
FIG. 5 is a block diagram for explaining operation blocks of a main CPU shown in FIG. 4.

FIG. 5 shows a functional block of the main CPU 11. The main CPU 11 controls an image signal transfer from a reader system 30 including the CCD to the buffers 32 to 34 and the driving of motor driver system 31 for driving the motor 31 when an interrupt signal is supplied to the main CPU 11. The main CPU 11 performs the coding process (35) of the image data from the buffers 32 to 34 and transfers the coded data to the FiFo memory 36.

The motor 17 is driven at a low speed. During reading, one-line length of the original sheet is constantly fed at the minimum transmission period of 10 msec. The charge time of the CCD 20 is set at 10 msec In order to obtain a uniform reading line density, only the charge in the CCD 20 for 10 msec during operation of the motor is used as the read data.

The CCD will be described in detail hereinafter. The charge operation is unconditionally performed every 10 msec. On the other hand, the motor is driven under the control of software. The one-line driving of the motor is performed intermittently. The 10-msec operations of the CCD and the motor are synchronized in response to an output pulse from the timer circuit 19. Since the motor is synchronized with the CCD, an interrupt signal is generated by software in units of 10 msec. Three interrupt signals complete one-line reading (storage of image data in the line buffers).

(1) First Interrupt

When the destination line buffer is empty, the motor is driven to feed the recording sheet by the one-line length.

(2) Second Interrupt

The data charged by the exposure section 21 in the CCD 20 is latched by the transfer section 22, and the DMA operation is started.

(3) Third Interrupt

The CPU detects that the data in the line buffer is effective and sets a flag for the main routine.

Figure 6:
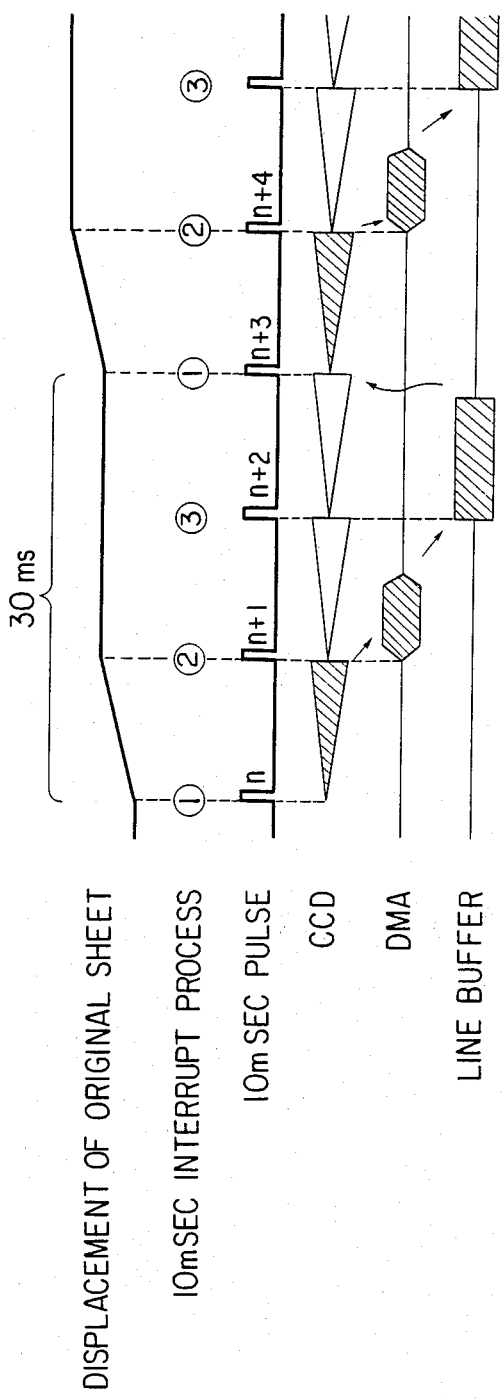
FIG. 6 is a timing chart for explaining an operation when a single line buffer is used.

The operation of the second embodiment will be described with reference to FIG. 6 wherein a single line buffer is used.

Figure 7:
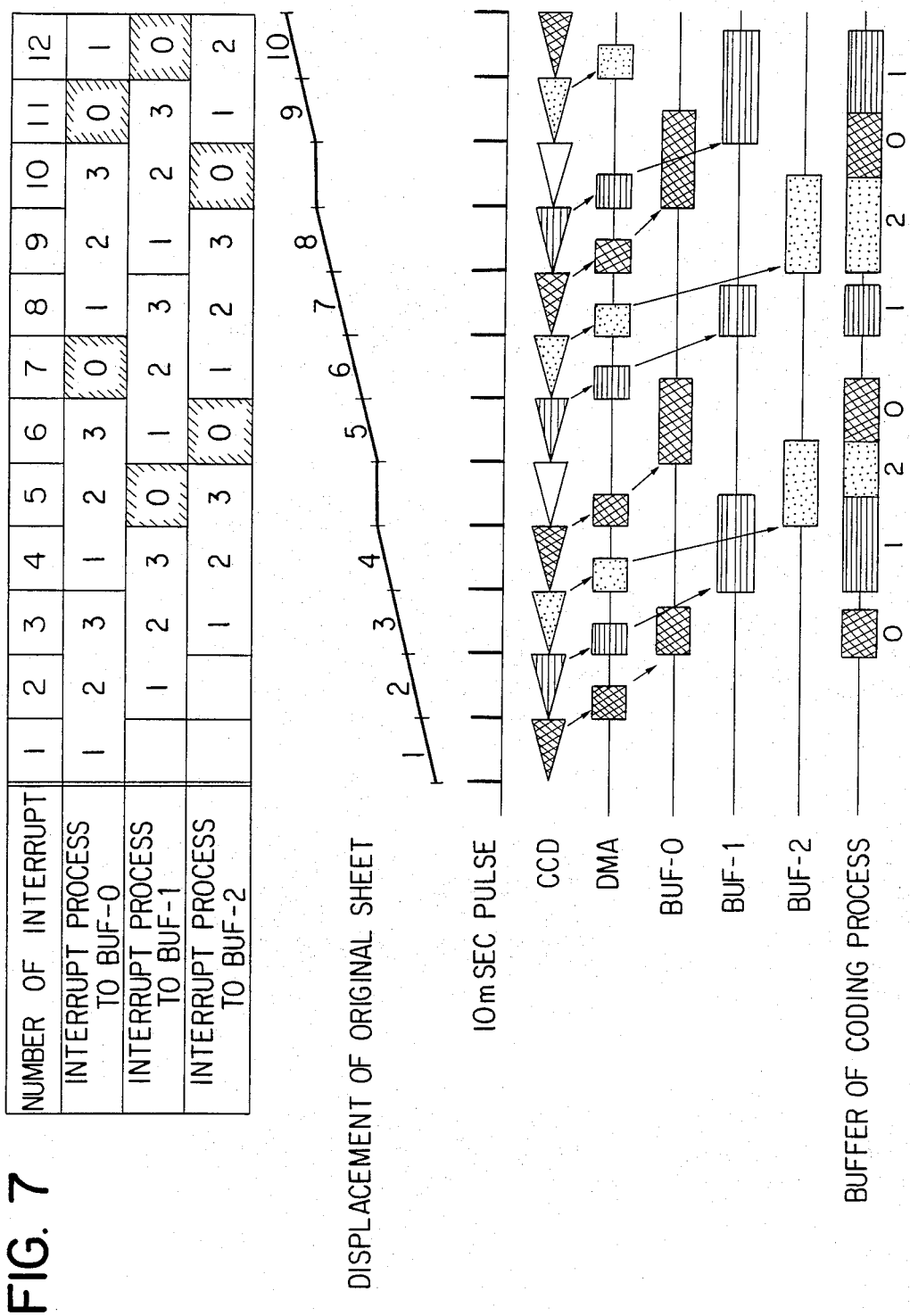
FIG. 7 is a timing chart for explaining the operation of the second embodiment.

The line buffer is "empty" at a 10 msec pulse n. A one-line start signal is supplied to the motor control sub-CPU 15. At a 10 msec pulse n+1, the main CPU 11 starts to transfer the data from the CCD 20 to the line buffer under the control of the DMA controller 14. This DMA process is always completed within 10 msec. At a 10 msec pulse n+2, since the DMA started by the pulse n+1 is completed, the main CPU generates a signal representing that the line buffer is full, so that a coding process main routine is started. At a 10 msec pulse n+3, the line buffer is already empty, and the same process as that at the 10 msec pulse n is performed. In this manner, one-line reading is completed. However, when the single line buffer is used, it takes at least a period of 30 msec for one-line reading. In addition, when the coding process requires a period of not less than 10 msec, the one-line data is read within 40 mmsec or longer In other words, when the single line buffer is used, the upper limit of the read rate is 30 msec/line. In order to achieve a read rate of 10 msec, three line buffers are used in this embodiment. The operation of this embodiment will be described with reference to FIG. 7. FIG. 7 shows a table of process contents for the respective buffers of each interrupt operation and a data flow thereof. The process content "0" during the interrupt operation indicates that the buffer of interest is not "empty". In this case, no operation is performed.

As shown in FIG. 7, the three interrupt operations (1), (2) and (3) described above are performed by parallel processing for the respective line buffers. When the coding process is performed within the minimum transmission time of 10 msec, the original can be constantly fed, and idle time is eliminated.

Figure 8:
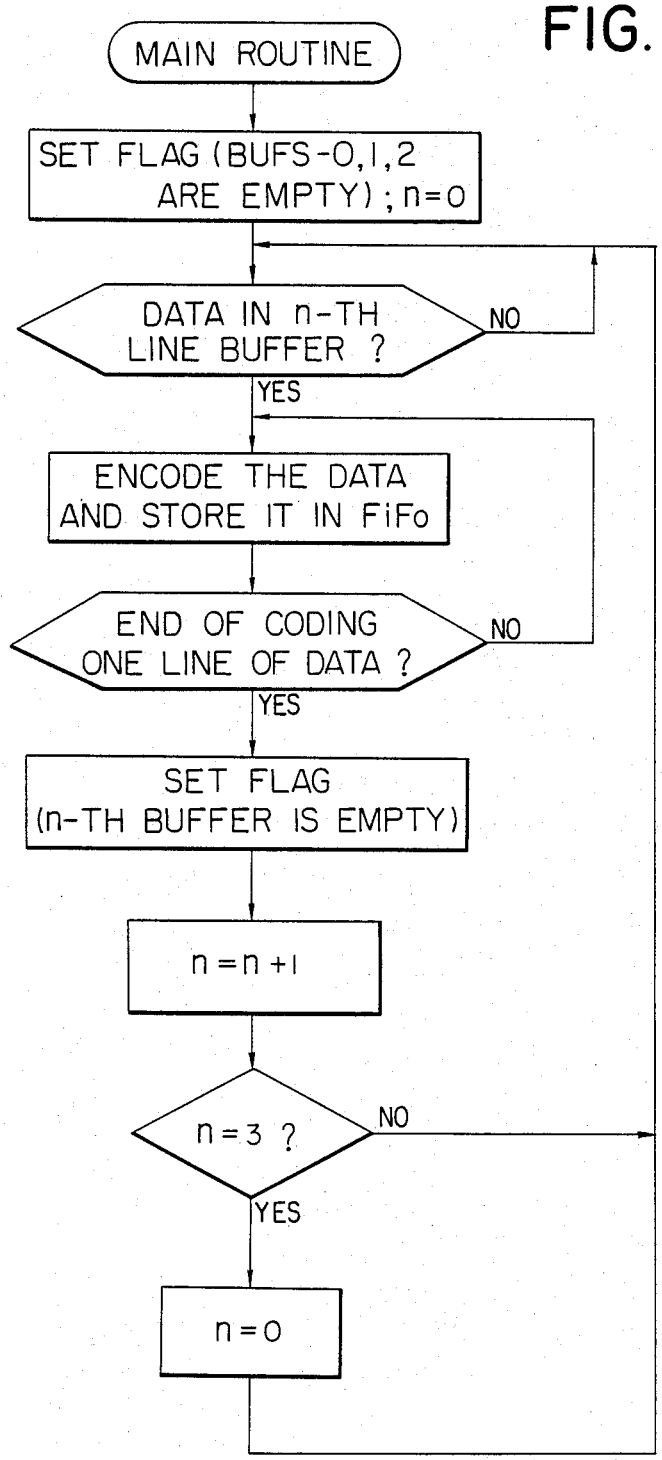
FIG. 8 is a control flow chart for explaining a coding process of the main CPU shown in FIG. 4.
Figure 9A:
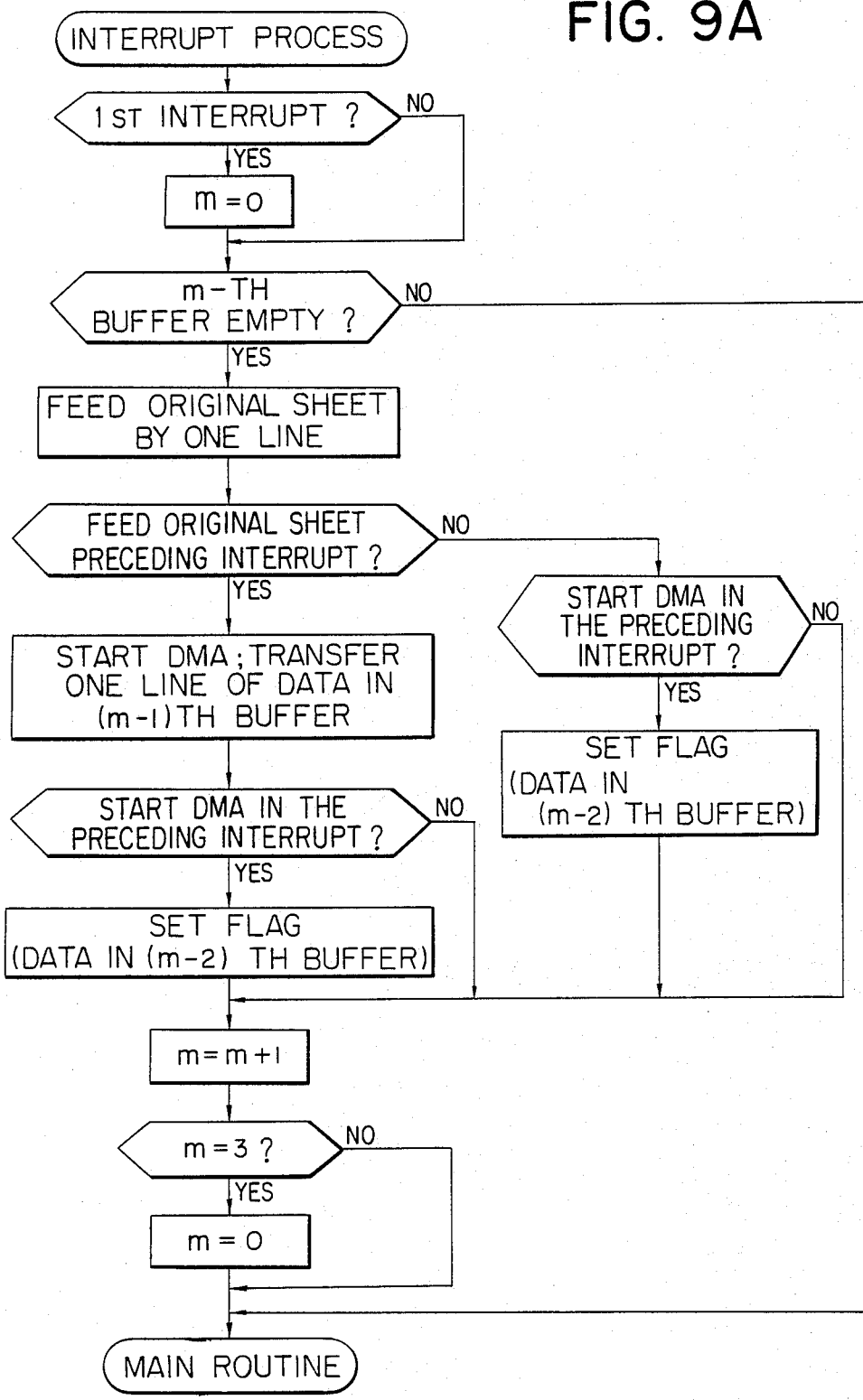
FIG. 9 composed of FIGS. 9A and 9B is a control flow chart for explaining an interrupt process routine.

FIG. 8 shows a control flow of the main routine for a coding process under the control of the main CPU 11. FIG. 9 is a control flow of an interrupt process routine under the control of the CPU 11. The process programs of FIGS. 8 and 9 are stored in the ROM 12 in FIG. 4.

The CCD charge, one-line original sheet feeding, and the data transfer to the buffer can be performed within the minimum transmission time, as described above, so that the original image can be effectively read.

In the above embodiment, the minimum transmission time $T_{MIN}$ and the charge time Ts of the CCD, and the displacement time $T_M$ of the one-line length match with each other. However, it is essential to establish inequalit $T_{MIN} \geq T_s$ or $T_M$. The time $T_D$ for DMA preferably satisfies inequality $T_{MIN} \geq T_D$.

By using three line buffers, when the coding process is completed within the minimum transmission time, original sheet feeding need not be stopped, so that the original image can be continuously read. Furthermore, since the image data read while the original sheet is being fed is stored in the buffer memories, the original image can be read with a uniform density.

The time required for one-line feeding of the original sheet is substantially the same as the charge time of the photo sensor. The data is read out only while the original sheet is being fed. Therefore, an inexpensive low-speed compact motor can be used.

Furthermore, since the charge time of the photo sensor can be increased to some extent, a low-power light source can be used. As a result, the image reading apparatus becomes compact as a whole and has low power consumption.

The present invention is not limited to the particular embodiments described above. Various changes and modifications may be made without departing from the scope of the appended claims.

What I claim is:

1. A facsimile system comprising:
   a photo line sensor for reading image data of an original;
   displacing means for effecting a relative displacement between the original and said photo line sensor;
   temporary storage means for temporarily storing image data read by said photo line sensor;
   transferring means for transferring the image data read by said photo line sensor to said temporary storage means;
   pulse generating means for generating a pulse for every predetermined period;
   controlling means for controlling a storage operation of said photo line sensor, a displacement operation of said displacing means, and a transfer operation of said transferring means in synchronism with the pulse;
   coding means for coding the image data stored in said temporary storage means; and
   modulating means for modulating image data coded by said coding means so as to transmit the image data,
   wherein said temporary storage means has a capacity corresponding to at least three lines, and the displacement operation is performed when capacity corresponding to one line is vacant, the image data is supplied through the transfer operation with respect to the capacity corresponding to one of the other lines of capacity, and said coding means performs the coding operation with respect to the image data within the capacity corresponding to another one line of capacity.

2. A system according to claim 1, wherein the predetermined period of the pulse is substantially equal to a storage period of said photo line sensor.

3. A system according to claim 2, wherein said transferring means transfers the image data stored by said photo line sensor, while the original is being fed, to said temporary storage means by a direct memory access controller.

4. A system according to claim 3, wherein the storage operation of said photo line sensor, the transfer operation of said transfer means and the displacement operation of said displacing means are performed in parallel.

5. A system according to claim 4, wherein the storage period is substantially equal to the displacement time.

6. A facsimile system comprising:
 a photo line sensor for reading image data of an original;
 displacing means for effecting a relative displacement between the original and said photo line sensor;
 temporary storage means for temporarily storing image data read by said photo line sensor;
 transferring means for transferring one-line image data read by said photo line sensor to said temporary storage means; and
 controlling means for controlling said displacing means and said transferring means, and for coding the image data stored in said temporary storage means,
 wherein said controlling means performs the controlling operation according to a program to control said displacing means for a predetermined period through an interruption processing and to perform the coding processing according to an ordinary routine, and
 wherein said temporary storage means comprises a capacity of at least three lines of image data.

7. A system according to claim 6, wherein said controlling means controls the transfer operation of said transferring means for every predetermined period through the interruption processing.

8. A system according to claim 6, wherein the storage time of said photo line sensor is substantially equal to the displacement time of said displacing means.

9. A system according to claim 6, wherein the displacement operation is performed when capacity corresponding to at least one line is vacant in said temporary storage means, the image data is supplied through the transfer operation of said transferring means with respect to the capacity corresponding to one of the other two lines of capacity, and the coding processing is performed with respect to the capacity corresponding to another one line of capacity.

* * * * *

UNITED STATES PATENT AND TRADEMARK OFFICE
CERTIFICATE OF CORRECTION

PATENT NO. : 4,864,416

DATED : September 5, 1989

INVENTOR(S) : YUJI ISHIKAWA

It is certified that error appears in the above-identified patent and that said Letters Patent is hereby corrected as shown below: On the title page:

AT [56] REFERENCES CITED

U.S. Patent Documents,
"4,748,514  3/1988  Bell.....358/288" should read
--4,748,514  5/1988  Bell.....358/288--.

AT [57] ABSTRACT

Line 5, "datas" should read --data--.

COLUMN 2

Line 16, "controlled" should read
--controlled according--.

COLUMN 5

Line 58, "40 mmsec" should read --40 msec--.

UNITED STATES PATENT AND TRADEMARK OFFICE
CERTIFICATE OF CORRECTION

PATENT NO. : 4,864,416

DATED : September 5, 1989

INVENTOR(S) : YUJI ISHIKAWA

It is certified that error appears in the above-identified patent and that said Letters Patent is hereby corrected as shown below:

COLUMN 6

Line 19, "inequalit" should read --inequality--.

Signed and Sealed this

Seventh Day of July, 1992

Attest:

DOUGLAS B. COMER

Attesting Officer

Acting Commissioner of Patents and Trademarks